United States Patent [19]

Kisiel

[11] 4,242,627

[45] Dec. 30, 1980

[54] BATTERY CHARGER

[76] Inventor: Edmund Kisiel, 7104 Thorncliffe Blvd., Parma, Ohio 44134

[21] Appl. No.: 857,101

[22] Filed: Dec. 5, 1977

[51] Int. Cl.³ .............................................. H02J 7/10
[52] U.S. Cl. ...................................... 320/21; 320/32; 320/39
[58] Field of Search ...................... 320/20, 21, 22-24, 320/39, 32

[56] References Cited

U.S. PATENT DOCUMENTS

| | | | |
|---|---|---|---|
| 3,382,425 | 5/1968 | Legatti | 320/32 |
| 3,586,955 | 6/1971 | Kisiel | 320/39 |
| 3,766,463 | 10/1973 | Ruben | 320/23 |
| 3,781,631 | 12/1973 | Nelson et al. | 320/25 |
| 3,876,921 | 4/1975 | Bigbee | 320/21 X |
| 4,031,451 | 6/1977 | Gordon | 320/39 X |

Primary Examiner—Robert J. Hickey

Attorney, Agent, or Firm—Squire, Sanders & Dempsey

[57] ABSTRACT

A battery charging system for charging a battery from an AC source, including control rectifier means for rectifying the charging current, a pulse generator for triggering the rectifier to control the transmission of current to the battery, phase control means for timing the firing of the pulse generator according to the charge on the battery, and various control means for alternatively controlling the phase control means depending upon the charge on the battery; wherein current limiting means are provided for limiting the charging current according to the charge on the battery to protect the system from excessive current in the event a weak battery is being charged, a feedback circuit is provided for maintaining the charge on a battery to compensate for battery leakage, and circuitry is provided for equalizing the voltage between the respective cells of the battery.

22 Claims, 2 Drawing Figures

BATTERY CHARGER

BACKGROUND OF THE INVENTION

1. Field of the Invention

This invention relates to the charging of direct current storage batteries.

2. Description of the Prior Art

Battery charging systems have been devised for automatically recharging batteries while protecting the system against damage from high current flow. The charging current is often regulated in such systems through some type of phase control circuit for varying the portion of the AC cycle during which charging occurs, according to the existing charge on the battery.

There has heretofore not been known an automatic battery charging system wherein effective current limiting circuitry is provided for protecting the system, particularly against high currents experienced when the battery is severely discharged and hence is calling for a high charging rate. In most automatic battery chargers, the charging rate is regulated according to the current in the DC charger output circuit or in the primary circuit of the AC transformer; such circuits are inadequate in that they only operate properly until the battery voltage drops about 20% of its normal charge, and then either cease to function or else the charger is shut off and on out of synchronization until a circuit breaker is tripped or a fuse blows to save the circuit.

Additionally, present automatic battery chargers lack circuitry for compensating effectively for leakage from a charged battery. Some automatic battery chargers have controlled rectifiers for transmitting current to the battery being charged according to signals generated from a phase control circuit. The latter circuit generally employs a capacitive device which is charged and discharged according to the voltage in the battery. However, when the battery is fully charged, a small amount of leakage will occur and the capacitive device can charge and discharge randomly—out of synchronization with the AC source, wherefore the leakage is not compensated for effectively. This phenomenon is known as "latching". Prior attempts to correct "latching" have involved the use of extra, usually costly, circuitry.

Another shortcoming of existing battery chargers is their failure to equalize the charge in the respective cells of the battery. It is known that the cells of a battery have an ideal voltage and that these cells tend to discharge or leak at varying rates, causing their voltages to vary. For instance, the ideal voltage for a 6 cell, 12 volt battery is 2.17 volts per cell (or 13.02 volts for the 12 volt battery) under which conditions the battery has a maximum life. As a result of the variation in cell voltage, the more highly charged cells generate more gas and use more water. Therefore battery manufacturers recommend that batteries be slightly overcharged to equalize the charge on each cell.

U.S. Pat. No. 3,296,515 (Knauth) discloses a battery charger for charging at a rate commensurate with the charge below normal of the battery. Protection is provided against damage from short circuits, reverse polarity hook-ups, and other deleterious situations. The system includes a controlled power rectifier which is connected to the battery, and which is rendered conductive by a gate firing circuit according to the voltage difference between the rated voltage of a zener diode and the actual battery voltage. There is no compensation for leakage once the battery is charged. A pulsating DC signal rather than pure pulses, controls the gating signal to the lower rectifier, and as the battery approaches a full charge the gating signals become erratic, causing the rectifier to fire randomly. Also, since the charger turns off once the battery is charged, a switch is provided to reactivate the charger.

A prior patent to the present inventor, U.S. Pat. No. 3,586,955, discloses a battery charger wherein a transformer is coupled to a silicon controlled rectifier (SCR) whose power output is controlled by a sensing network coupled to a phase control circuit. The firing of the SCR is effected by pulses generated by a unijunction transistor. Circuit protection is provided for limiting the current in the system by leaking some of the charge from the capacitor in the unijunction circuit to delay the firing of the SCR when the load on the battery exceeds the charging rate of the charger. Although this was an effective charger, its effectiveness diminished for severely discharged batteries, and there was no compensation for leakage from a charged battery. Also, no short circuit or reverse polarity battery protection was provided.

A battery charger employing a pair of SCRs triggered by unijunction circuits is the subject of U.S. Pat. No. 3,766,463 (Ruben). The unijunction circuits are fired under the control of pedestal and cosine modified ramp trigger circuits. A special circuit is provided for preventing the unijunction circuit from being latched on. Although some system protection devices are incorporated in the charger, there is no provision for limiting the current therein or for reverse battery polarity connection.

U.S. Pat. No. 3,930,197 (Saylor) discloses a synchronous voltage regulator system having a permanent magnet coupled to three phase windings. Current output is regulated by SCRs which are gated by a ramp and pedestal unijunction circuit. If excessive currents occur the unijunction will latch on and quit, wherefor a special (and expensive) four-layer diode is provided to bypass the excess current.

The prior art fails to disclose a battery charger which effectively charges a severely discharged battery, smoothly with perfect synchronization between the charging current and the phase control circuit; prior chargers fail to compensate for leakage from charged batteries; and prior chargers fail to equalize the voltage between the cells of a battery. The prior art suffers from other deficiencies which are not present in the invention described herein.

SUMMARY OF THE INVENTION

An object of this invention is to provide a battery charger for charging a battery in a controlled and accurate manner regardless of the charge on the battery.

It is also an object of the present invention to provide a battery charger for charging a storage battery while preventing damage to the charger from excessive loads.

Another object of the invention is to provide a battery charger for charging a DC battery from an AC source at a rate inversely proportional to the charge on the battery.

Yet another object is to provide a battery charger whose charging rate varies uniformly as the battery charge changes from being nearly fully discharged to being charged.

It is an object of the invention to provide a battery charger for maintaining the float voltage on a battery level regardless of variations in the power line source from which the battery is being charged.

Another object is to provide a battery charger for charging a multi-cell battery and for equalizing the charge on the respective cells.

Yet another object of the invention is the provision of a battery charger for compensating for leakage from a substantially charged battery.

A still further object is to provide a battery charger employing a unijunction circuit in which latching cannot occur.

A general object is to provide an improved battery charger which is efficient and effective in use, and economical to manufacture and use.

Other objects will be apparent from the description to follow and from the appended claims.

These objects are achieved according to the preferred embodiment of the invention by the provision of various improvements to a battery charging system comprising a control rectifier circuit such as an SCR circuit for transmitting current from an AC source to the battery being charged, a pulse generator for triggering the rectifier means to transmit current for a time period dependent upon the point of the AC current cycle in which the rectifier is triggered, and a phase control circuit for actuating the pulse generator to effect the transmission of charging current to the battery at a rate inversely proportional to the charge on the battery. The phase control circuit includes a set of control sub-circuits including control devices which monitor the battery voltage and alternatively regulate the charging current to the battery, depending on the charge on the battery. An important aspect of the present invention relates to means for limiting the current flowing in the system to protect the system. Such current limiting is accomplished by circuitry including an opto-coupler comprising a lamp whose brightness varies with the battery charge and a photocell connected to adjust the phase control circuitry to advance the firing of the control rectifier means (with a corresponding adjustment to the battery charging rate) as the battery voltage decreases with a commensurate change in lamp illumination, and a transistor for limiting the lamp illumination and hence the charging current, when the battery charge is low and the charging current would otherwise be relatively high. A set of transistors controls the charging rate when the battery is severly discharged, one transistor of which samples the battery voltage and reduces the forward bias on a second transistor to limit current flow through the circuit to non-deleterious values.

Another important aspect of the invention pertains to float voltage control to establish the fully charged value for the battery. Also an important part of the invention is the circuitry which provides compensation for leakage from a charged battery, by adjusting the phase control circuitry to advance the firing point of the control circuitry to advance the firing point of the control rectifier for small decreases in battery voltage—this being accomplished while maintaining synchronization between the phase control circuitry and the AC current.

A further aspect of the invention relates to circuitry for equalizing the voltage between the respective cells of the battery by overcharging the battery a controlled amount through adjustment to a reference voltage against which the battery voltage is measured in the operation of the phase control circuitry.

Figure 1:
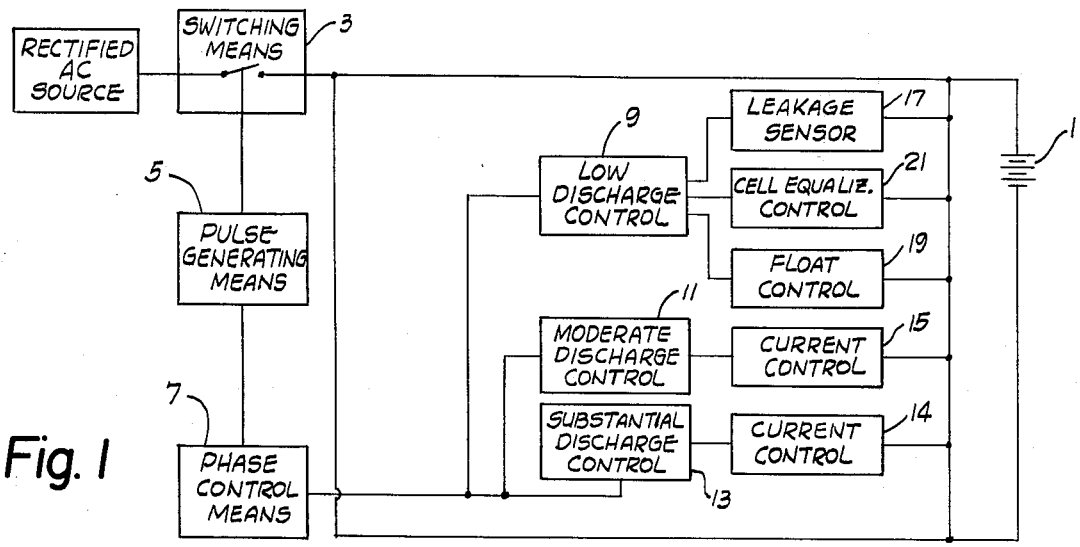
FIG. 1 is a schematic drawing of a battery charging system according to the present invention.

Referring to the block diagram in FIG. 1, an electrical battery charging system for charging a battery 1 is shown which includes a switching means 3 for regulating the flow of electrical current from rectified AC power source to the battery, a pulse generating means 5 for emitting pulses which trigger switching means 3 to transmit current to battery 1, and a phase control means 7 for regulating the trigger point of the pulse generator relative to the wave form of the AC source according to the charge on the battery as reflected by control signals from either a Low Discharge Control 9, a Moderate Discharge Control 11 or a Substantial Discharge Control 13 depending on the charge on battery 1 across which the foregoing three control devices are connected.

When a substantially discharged or nearly dead battery 1 is connected to the battery charging circuit of FIG. 1, devices 9–11 are rendered relatively ineffective by appropriate by-pass or disabling means, and Substantial Discharge Control device 13 controls the operation of switching means 3 through its control of phase control means 7. Device 13 generates signals according to the low (but increasing) charge on battery 1, to regulate the operation of phase control means 7, and the latter in turn triggers pulse generating means 5 to fire and operate switching means 3 to effect the charging of battery 1. When battery 1 is highly discharged and device 13 is controlling phase control means 7, the net result is to advance the triggering of switching means 3 relative to the rectified AC current being transmitted thereto, and a Current Control device 14 connected to device 13 protects components of the system against otherwise dangerous current levels. If the battery is moderately discharged, Moderate Discharge Control 11 assumes control of phase control means 7, to effect the retarding the triggering of switching means 3 relative to that effected by device 13 when the latter is in control. A Current Control 15 is connected to Moderate Discharge Control 13 and functions to limit the current in the circuit to a value determined to be non-deleterious to the components of the circuit, despite the high current values which would be effected in the absence of device 15. This current limiting is accomplished by causing phase control means 7 to retard the triggering of switching means 3.

When the battery is substantially fully charged, Low Discharge Control 9 controls the output of phase control means 7. Low Discharge Control 9 is itself under the control of a Leakage Sensor 17, a Float Control 19, and a Cell Equalization Control 21. The latter three controls can act simultaneously to control Low Discharge Control 9. Float control 19 compares the actual voltage on battery 1 to a reference value corresponding to the voltage of a fully charged battery (i.e. the rated charge), and causes Low Discharge Control 9 to generate a signal for triggering switching means to charge battery 1 to its rated voltage. Leakage sensor 17 functions as a stability control to compensate for leakage from a substantially fully charged battery, and causes control 9 to generate the signals necessary to maintain a full charge on the battery. Cell Equalization Control 21 operates to overcharge battery 1 to compensate for the unequal discharging of the cells of which the battery is composed, to assure that all of the cells are charged at least to their respective rated values.

The foregoing control device 9–13 are in effect actuated alternatively to control the operation of phase control means 7 only for a particular range of voltages to which the battery being charged is actually charged, whereby the battery is charged in a smooth manner virtually regardless of the charge in the battery.

Figure 2:
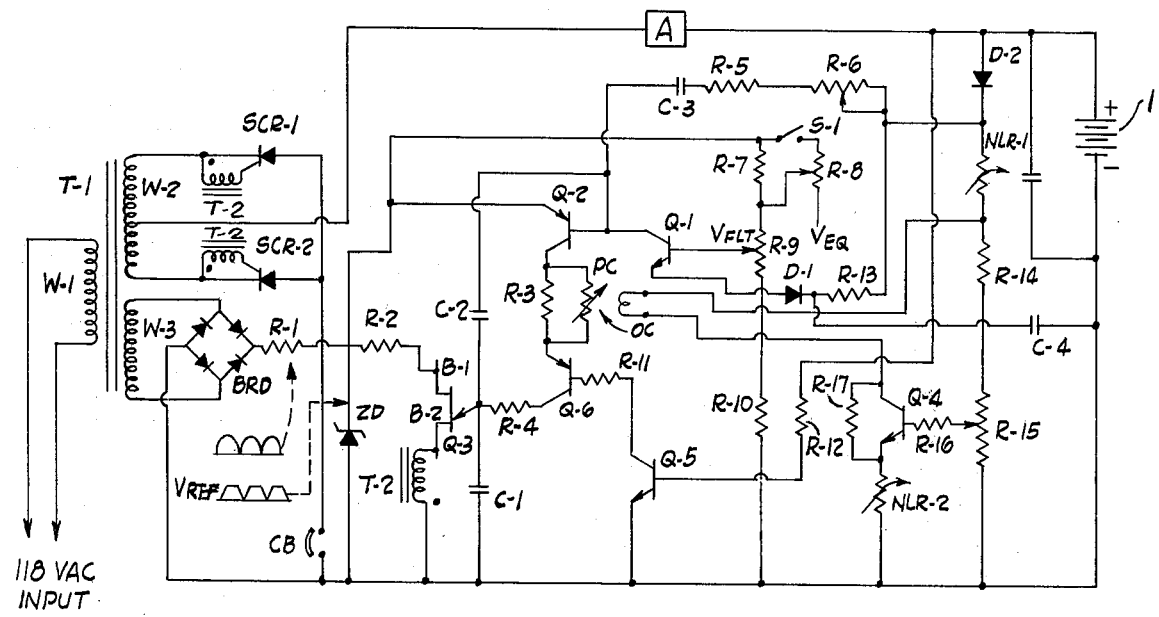
FIG. 2 is a schematic diagram of a circuit according to the preferred embodiment of the invention.

A circuit diagram of the preferred embodiment of the invention is illustrated in FIG. 2. The system shown uses power supplied by an AC source, shown in the drawing as an 118 V main power line source connected to a step-down transformer T-1 having a primary winding W-1 and secondary windings W-2 and W-3 wound about the same core. Winding W-2 is a center-tapped secondary, with each leg being connected to a switching means in the form of controlled rectifier means shown as silicon controlled rectifiers SCR-1 and SCR-2 respectively, these being connected to the secondary winding of transformer T-2. SCR-1 and SCR-2 function as a full wave rectifier, and transmit a direct current when their electronic gates are triggered by a pulse, as discussed below. Once triggered, the SCRs transmit current from the anode to the cathode until the anode voltage is near zero relative to the cathode. When a 60 cycle supply is used, the gates' electrodes can be triggered 120 times per second due to the full wave rectification of SCR-1 and SCR-2. The power output of the controlled rectifier is regulated by a phase shift method as discussed hereinafter. Since windings W-2 and W-3 are wound on a common core, the voltage across them is always in phase and there is a precise synchronization between the firing of the rectifiers SCR-1 and SCR-2, and the current in the W-3 circuit.

Transformer winding W-3 acts as a low current power supply for the battery charging control circuit described below. Winding W-3 is connected to a full wave rectifier shown as a bridge rectifier BRD, which converts the input AC voltage to a pulsating DC voltage. The current from rectifier BRD passes through a current limiting resistor R-1 which functions to protect a zener diode ZD, across which the voltage from rectifier BRD is impressed. The voltage across zener diode ZD remains constant at a value $V_{REF}$ regardless of input power variations. Zener diode ZD will not conduct until the voltage across it reaches a critical value or zener point, and then current will flow while maintaining the voltage across ZD at $V_{REF}$. The pulse generating circuitry corresponding to pulse generating means 5, comprises a unijunction transistor (UJT) Q-3. A UJT has a firing point which depends on its intrinsic standoff ratio (n), this ratio being a fixed fraction of the voltage across the bases of the UJT. Unijunction transistors are acknowledged as being ideal devices for use in SCR trigger circuits, since they have a stable trigger voltage, they use a very low trigger current, they operate over a wide temperature range and normally have a peak emitter current rating of 2 amperes. Silicon controlled rectifier circuits using unijunction transistors are simple and have a low power consumption and a high effective power gain in phase control circuits. Whenever the voltage on capacitor C-1 (discussed below) reaches the breakover or peak point voltage of the emitter of the UJT Q-3 (based on the value of n), device Q-3 turns on and capacitor C-1 discharges through base-one B-1 of UJT Q-3 into the primary winding of trigger transformer T-2, and the secondary windings of T-2 gate or trigger SCR-1 and SCR-2; this discharge continues until the unijunction transistor turns off.

A phase shift circuit corresponding to phase control means 7 (FIG. 1) is shown as a resistor-capacitor (R-C) circuit comprising a resistor R-4 and a capacitor C-1, connected to UJT Q-3. By controlling the charge on capacitor C-1, the triggering of UJT Q-3 and the firing of the SCRs is controlled.

The flat-topped pulsating DC voltage $V_{REF}$ is applied to the emitter of transistor Q-2 and across a voltage divider comprising resistor R-7, potentiometer or variable control resistor R-9 and resistor R-10. A second transistor Q-1 has a base connected to the movable arm of potentiometer R-9 and an emitter connected to a diode D-1 through a current limiting resistor R-13 which is connected to the junction of a diode D-2 and a non-linear resistor NLR-1 described below. The voltage across the battery being charged is sampled at the foregoing connection of resistor R-13. The arm of potentiometer R-9 is set to adjust the reference voltage $V_{FLT}$ to equal the voltage of a fully charged battery (i.e. the float voltage), and this voltage is applied to the base of transistor Q-1 so that no current can flow through Q-1 unless the voltage on the battery falls below the voltage value of a fully charged battery as reflected by the setting of R-9. Thus, when the battery voltage falls below the fully charged value due either to leakage, to a load on the battery, or to the battery having been initially discharged when connected to the charging system, the transistor Q-1 is biassed to cause current to flow from the base to the emitter in proportion to the voltage difference between the reference voltage as established by the setting of R-9 and the actual battery voltage. Current also flows in this situation through the collector of Q-1, multiplied however by the gain of transistor Q-1. Current additionally flows from the emitter to the collector of transistor Q-2 since the base of Q-2 is connected to the collector of Q-1, the current through Q-2 being multiplied by the gain of transistor Q-2.

The input to the phase control circuitry R-4, C-1 is alternatively provided by the transistor Q-2, a resistor R-3 and a photocell PC, and a transistor Q-6. The flat-topped pulsating direct current from transistor Q-2 proceeds through resistor R-3 which is connected in parallel with variable resistance photocell PC forming part of an opto-coupler OC. This direct current is further applied to the emitter of the third transistor Q-6, and through the collector of transistor Q-6 and resistor R-4, to charge capacitor C-1. Until battery 1 is discharged to such an extent that transistors Q-1 and Q-2 are saturated, these transistors control the firing of SCR-1 and SCR-2 through control of the phase control means discussed above. It is contemplated that these transistors would control the phase control means when the battery being charged is charged from three-quarters of its full, rated voltage to the fully charged value. Transistor Q-2 corresponds to Low Discharge Control 9, and transistor Q-1 in combination with potentiometer R-9 correspond to Float Control 19 (FIG. 1).

The opto-coupler OC corresponds to Moderate Discharge Control 11 (FIG. 1) and includes photocell PC and a lamp L whose illumination varies according to the battery voltage due to the connection of the terminals of lamp L at the junction of non-linear resistor NLR-1 and resistor R-14, and to the collector of a transistor Q-4 whose base is connected through a fixed, current limiting resistor R-16 to a variable resistor R-15. Current flowing through diode D-2 proceeds through non-linear resistor NLR-1, lamp L, resistor R-17 connected in parallel with transistor Q-4, and then through non-linear resistor NLR-2. Transistor Q-4, and the resistors associated therewith, correspond to current control 15 in FIG. 1.

Variable resistor R-15 functions as a current limiting control potentiometer whose resistance is varied to adjust the forward bias on transistor Q-4, to in turn control the current in lamp L. The opto-coupler is selected so that the illumination of lamp L is at the critical value required to cause the resistance of photocell PC to assume a value at which, due to the resistance-illumination relationship of the photocell, any decrease in the illumination on photocell PC effects a large increase in the latter's resistance (the photocell is of the type whose resistance versus illumination curve displays a sharply increasing slope at the particular critical illumination referred to herein when the illumination drops below that critical value). A decrease in the voltage of the battery being charged effects a corresponding decrease in the drive on transistor Q-4, which in turn increases the resistance across transistor Q-4. The resistance increase on transistor Q-4 likewise causes the illumination of lamp L to fall, and the resistance of photocell PC rises sharply. An increase in the resistance of photocell PC is reflected by a relatively large voltage drop thereacross, to increase the charging time of capacitor C-1, thereby delaying the triggering of the gates of silicon controlled rectifiers SCR-1 and SCR-2. This delay reduces the charging current in the system, and protects the system against high current as when the battery is severely discharged. Likewise, when the battery charge is higher, the various electrical charges referred to above are reversed and the triggering of the gates of SCR-1 and SCR-2 is advanced to effect a corresponding increase in the battery charging current. Of course, the effect on the charging current is most significant under conditions at the critical illumination of the photocell as discussed.

Even though it is important to protect the circuit against large currents, it is also desirable to avoid abrupt changes in the current in the battery charging system. For example, the charging current will abruptly terminate when the illumination of lamp L drops below the foregoing critical value. In order to avoid this occurrence, resistor NLR-1 is selected to have a non-linear resistance such that its resistance varies according to the voltage impressed thereacross. Thus, when the battery voltage decreases, the voltage across resistor NLR-1 decreases causing its resistance to fall; this decrease in resistance in turn increases the voltage across lamp L and the illumination of the latter becomes brighter, to in effect flatten the resistance vs. illumination curve of photocell PC to thereby attenuate the drop in current in the system when the battery charge is very low.

Non-linear resistor NLR-2 connected to transistor Q-4 functions in a manner smilar to resistor NLR-1. The resistance of resistor NLR-2 also decreases when the voltage across it declines. When the battery charge decreases and the current flow through resistor Q-4 declines, the voltage across resistor NLR-2 also declines. The drop in the voltage across resistor NLR-2 decreases the back bias on transistor Q-4 and increases the gain of the latter, to effect a greater illumination of lamp L and to in effect level out the resistance v. illumination response curve of photocell PC.

Opto-coupler OC controls the operation of the phase control circuitry when battery 1 is charged from approximately one-quarter to one-half of its full charge. This limited control occurs because when the battery is highly charged, lamp L is very bright, causing photocell PC to assume a low resistance and current flows virtually unimpeded therethrough; when the battery is severely discharged, photocell PC is virtually non-conductive and the full current flow is through R-3.

Transistor Q-6, connected to photocell PC and resistor R-3, serves two capacities. In one capacity it acts as a protective switch for preventing activation of the battery charging system in the event a battery is connected in the system with its polarity terminals reversed. The base of transistor Q-6 is connected through a current limiting resistor R-11 to the collector of a transistor Q-5, and is thus driven by transistor Q-5 whose base and emitter are connected across the battery. Therefore, transistor Q-6 is only conductive if transistor Q-5 is conductive. If a battery is connected with its terminals connected in reversed polarity from that illustrated, a back bias is impressed across transistor Q-5, rendering this device non-conductive. The non-conductive state of transistor Q-5 in turn causes transistor Q-6 to be non-conductive whereby further charging of capcitor C-1 is prevented, and this is further turn causes transistor Q-6 to be non-conductive whereby further charging of capacitor C-1 is prevented, and this in further turn terminates the generation of gating signals to silicon controlled rectifiers SCR-1 and SCR-2, discussed further hereinafter.

Provision exists for protecting other components of the system as well. When a battery is connected with a reversed polarity connection, diode D-2 does not conduct and lamp L does not light. The non-conductance of diode D-2 further protects the base-emitter junction of transistor Q-4 since no voltage is impressed across it.

In its other capacity, transistor Q-6 corresponds to Substantial Discharge Control 13 (FIG. 1), and functions to reduce the battery charging rate which when the battery is highly discharged from its fully charged state. When the battery is low, there is a slight forward bias on transistor Q-5, wherefore only a slight forward drive is impressed on transistor Q-6. Accordingly, the effective resistance of transistor Q-6 is high and the charging time of capacitor C-1 increases to retard the firing of unijunction transistor Q-3 and the triggering of rectifiers SCR-1 and SCR-2. Such retardation reduces the charging rate of the battery to protect the SCRs 1 and 2 from high instantaneous peak currents which otherwise would occur (high di/dt), despite the low average current. Transistor Q-6 is active in its latter capacity when the battery charge is from 15% to 25% of its rated value; for higher battery charges transistor Q-6 is saturated and fully conductive.

Short circuit protection is also provided in the illustrated system. In the event a short circuit were to occur across the battery, there would be no forward bias on transistors Q-5 and Q-6, and these devices would not be conductive. Also, resistor R-13 connected to the emitter of transistor Q-1 limits the current therein in the event of a short circuit or if a battery having a very low voltage were connected in the system.

Diode D-1 connected to the emitter of transistor Q-1 protects the base-emitter junction of the latter against a possible reverse current flow which could occur if the back bias across this junction exceeded the break over voltage of transistor Q-1 in the event there was a loss of power to the battery charging system. A capacitor C-4 can be connected between diode D-1 and the negative terminal of battery 1 to offer a low impedance to the emitter of transistor Q-1 to achieve very stable firing of the SCRs when the charging rate is low.

Even when the battery is fully charged, there is still some leakage which should ideally be compensated for in order to maintain a full charge on the battery. Unless special provisions were made for recharging the battery in this situation, leakage would not be compensated for because the charge on capacitor C-1 would build-up very slowly, and UJT Q-3 would turn on to discharge C-1 only when C-1 had accumulated the requisite charge; and the UJT would fire out of synchronization with the input current. Therefore, a feedback circuit corresponding to Leakage Sensor 17 (FIG. 1) is provided to turn on UJT Q-3 at the end of each half cycle of the input power, to drive a small charging current through the battery even when the battery is charged, to compensate for leakage. The feedback circuit includes a variable control resistor R-6, a resistor R-5, and capacitors C-2 and C-3. When current is flowing in the system, current flows through resistors R-6 and R-5, and capacitor C-3 becomes charged. Capacitor C-3 is connected to the base of transistor Q-2, and the voltage on capacitor C-3 biases transistor Q-2 forward. The latter situation causes current to flow through resistor R-3 and photocell PC to capacitor C-1 at an amplified rate due to the gain of transistor Q-2. The charging rate of capacitor C-3 is controlled by resistors R-5 and R-6, and the time constant of this capacitor is established at about 1/120 seconds to synchronize the discharge of capacitor C-1 and the resultant gating of rectifiers SCR-1 and SCR-2, with the input power to rectifiers SCR-1 and SCR-2. Capacitor C-2 is connected between transistor Q-2 and capacitor C-1 to stabilize the foregoing action and to assure smooth, non-latching performance.

The lowest charging rate for the battery is equal to the self discharge of leakage rate of the battery, regardless of termperature. For instance, if the battery temperature rises, so does the battery self discharge or leadage, but the charging rate also automatically increases so that synchronization is maintained.

A circuit breaker CB is provided for cutting the charging system circuitry off from the input power in the event there is a failure of a component in the system. Prior battery chargers would have such a circuit breaker activate when the current in the charger exceeded the rated value of the charger as when a severely discharged battery was being charged or during prolonged engine cranking, but due to the current limiting features of the present system, batteries are charged even when they are discharged down to only 15%-20% of their rated value (2—3 volts for a standard 12 volt battery).

Equalization of the voltage in the respective cells of the battery is accomplished by means of a variable control resistor R-8 to which is connected a voltage source $V_{EQ}$, which can be connected in parallel with the resistor R-7 by closing a switch S-1 in series with resistor R-8. When S-1 is closed, the voltage across float voltage control resistor R-9 and across resistor R-10 is raised, whereby the battery can be overcharged by any desired amount to achieve the desired equalization. The foregoing circuitry corresponds to Cell Equalization Control 21 (FIG. 1). As previously noted, a 6 cell, 12 volt lead acid battery conventionally has an ideal cell voltage of 2.17 volts per cell, or 13.02 volts for the battery. Since some cells discharge faster than others, battery manufacturers recommend a monthly equalizing of 2.33 volts per cell, or 13.98 volts for the 6 cell battery for about 8 to 10 hours at a low charging rate. This overcharge brings all the cells to an identical voltage because the voltage of each cell can only rise a certain amount for a particular charging current.

The various control means which regulate the phase control means are described herein as being "alternatively" operative in their controlling function. The term "alternatively" is not intended to foreclose the functioning of any one control means while another is controlling the phase control circuit and the firing of the pulse generating means since there can be some overlap during which more than one such control means is actively functional. Such overlap can provide for a smooth transition in the operation of the respective control means as the battery voltage changes.

The battery charging system described herein accomplishes all of the objects of the invention. The battery charger effectively charges batteries in a controlled manner, with the charging rate varying inversely with the remaining charge on the battery. Even when a battery is fully charged and the only discharge is the slight self-discharge leakage, an effective slow charging rate exists. When the battery charge is very low, however, the charging rate is decreased to protect the system, and in particular to protect the silicon controlled rectifiers.

Various protective features are included in the system. Current flow is limited to safe values, especially when a severely discharged battery is being charged. The current limiting circuitry enables the charger to operate even for batteries that have only 8–10% of their fully charged voltages. Whereas prior charges measured the battery charging current to determine the charging rate, the present system measures the voltage on this battery in adjusting the current flow. Reversed polarity protection is afforded to protect the system in the event the battery terminals are connected "backwards". The system is safe against short circuits and component failures as well.

Changes in the battery charging rate are effected smoothly, avoiding abrupt current and voltage changes. Moreover, the charging rate is infinitely variable. There is perfect synchronization between the firing of the silicon controlled rectifiers and the phase control circuitry under all operating conditions.

The float or reference voltage to which the battery is to be charged is held level, regardless of input power line variations. Equalization of the charge on the respective battery cells is achieved.

A battery is readily connectable in the described system, and this can be a permanent connection. The system can be constructed so that the power source can be disconnected from the battery charger, as where the charger is used at a dock, motor vehicle, or the like.

The controlled rectifiers are described as comprising a pair of silicon control rectifiers. These devices both control current flow and rectify the input current. Using two such devices is highly efficient, and due to low heat losses only a small heat sink is needed.

The same charger as discussed can be used for charging batteries of different capacities (i.e. different rated voltages), since the control circuitry and the battery charging circuitry draw their power from separate transformer windings.

The charging system discussed in detail herein is economical to manufacture. It can incorporate conventional components connected in standard fashion.

The invention has been described in detail with particular emphasis on the preferred embodiment thereof, but it will be understood that variations and modifications within the spirit and scope of the invention may occur to those skilled in the art to which the invention pertains.

I claim:

1. A battery charging circuit comprising:
   a source of rectified AC current;
   terminals for connecting a battery to be charged in the circuit;
   switching means actuable for transmitting current from said source to the battery in response to electrical pulses;
   a control circuit for controlling the actuation of said switching means to control the amount of current transmitted by said switching means, said control circuit including:
   pulse generating means actuable for generating pulses for actuating said switching means;
   phase control means responsive to control signals for controlling the actuation of said pulse generating means to control the actuating of said switching means relative to said rectified AC current;
   substantial discharge control means for transmitting control signals to said phase control means when the battery is substantially discharged to effect a charging current to the battery;
   moderate discharge control means for transmitting control signals to said phase control means when the battery is moderately discharged to effect a charging current to the battery;
   low discharge control means for transmitting control signals to said phase control means when the battery is slightly discharged to effect a charging current to the battery; and
   means for synchronizing said low, moderate and substantial discharge control means with the AC current;
   said low discharge control means, said moderate discharge control means and said substantial discharge control means being connected for actuation seriatim for controlling the charging of the battery, respectively, according to the voltage on the battery; the respective discharge control means including means for charging the battery in a continuous manner during the transition between the actuation of one of said discharge control means and the actuation of another of said control means for transmitting control signals to said phase control means.

2. The invention according to claim 1 wherein said low discharge control means includes:
   float control means for effecting the transmission of control signals to said phase control means when the battery is substantially fully charged to maintain a full charge on the battery.

3. The invention according to claim 1 wherein said low discharge control means includes:
   leakage sensor means for effecting the transmission of control signals to said phase control means when the battery is substantially fully charged to compensate for leakage from the battery.

4. The invention according to claim 1 wherein said low discharge control means further comprises:
   cell equalizing mens for effecting the transmission of control signals to said phase control means to overcharge the battery by an amount sufficient to charge all of the cells of which the battery is composed to their respective full charges.

5. The invention according to claim 1 and further comprising current control means electrically associated with said moderate discharge control means for measuring the voltage on the battery, and for limiting the current in the circuit to a value determined to be non-deleterious to the components of the circuit in accordance with the battery voltage.

6. The invention according to claim 5 wherein the current control means is adjustable according to the voltage capacity of the battery.

7. The invention according to claim 1 wherein said substantial discharge control means further comprises current limiting means for measuring the voltage on the battery, and for limiting the current in the circuit to values determined to be non-deleterious to the circuit in accordance with the battery voltage.

8. The invention according to claim 6 wherein the current limiting means is adjustable according to the voltage capacity of the battery.

9. The invention according to claim 1 wherein said low discharge control means comprises first transistor means electrically connected to said phase control means for adjusting said phase control means according to the charge on the battery to cause the charging rate on the battery to vary inversely proportionately with the charge on the battery; and wherein
   said cell equalizing means is electrically connected to said first transistor means and comprises means for establishing a cell equalization reference value corresponding to a voltage to which the battery must be charged to cause the respective battery cells to be fully charge, and comparing means for comparing the actual battery voltage to the cell equalization reference value and for causing said first transistor means to adjust said phase control means to charge the battery to the cell equalization reference value.

10. The invention according to claim 9 wherein said comparing means comprises second transistor means electrically connected to said first transistor means, and said means for establishing a cell equalization reference value includes means for impressing a voltage corresponding to the cell equalization reference value on said second transistor means to cause said first transistor means to adjust said phase control means to charge the battery to the cell equalization reference value.

11. A battery charging circuit comprising:
    a source of rectified AC current;
    terminals for connecting a battery to be charged in the circuit;
    switching means actuable for transmitting current from said source to the battery; and
    a control circuit for controlling the actuation of said switching means to control the amount of current transmitted by said switching means, said control circuit including:
    pulse generating means actuable for generating pulses for actuating said switching means;
    phase control means for controlling the actuation of said pulse generating means to control the actuation of said switching means relative to said rectified AC current;

first transistor means electrically connected to said phase control means for adjusting said phase control means according to the charge on the battery to cause the charging rate on the battery to vary inversely proportionately with the charge on the battery; and leakage control means electrically connected to said first transistor means for causing said first transistor means to adjust said phase control means when the battery is substantially fully charged to charge the battery to compensate for battery leakage; said leakage control means comprising second transistor means connected to said first transistor means, and a resistance-capacitance circuit connected across said first and said second transistor means for discharging in synchronization with the rectified AC current source to cause the adjustment of said phase control means to charge the battery in synchronization with the rectified AC current source.

12. The invention according to claim 11 and further comprising float control means connected to said first transistor means for comparing the actual battery voltage with a predetermined reference value and for generating control signals to charge the battery to the reference value when the actual battery voltage varies from said reference value.

13. A battery charging circuit comprising:

a source of rectified AC current;

terminals for connecting a battery to be charged in the circuit;

switching means actuable for transmitting current from said source to the battery in response to electrical pulses; and a control circuit for controlling the actuation of said switching means to control the amount of current transmitted by said switching means, said control circuit comprising:

pulse generating means actuable for generating pulses for actuating said switching means;

phase control means for controlling the actuation of said pulse generating means to control the actuation of said switching means relative to the rectified AC current;

lamp means connected to the battery and generating an illumination corresponding to the battery voltage; and variable photo-resistance means having a resistance variable with the illumination of said lamp means to adjust said phase control means to regulate the generation of said pulses relative to said rectified AC current to effect variation in the charging rate on the battery inversely with the charge on the battery; wherein the rate of change of resistance of said variable photo-resistance means relative to the illumination incident thereon changes sharply at a critical illumination value corresponding to a predetermined low battery charge which could effect the transmission of deleteriously high currents in the circuit, said transistor means effecting an illumination of said lamp means below said critical value when the battery voltage attains said predetermined low charge to limit the current in the circuit to a value below the deleterious high current value.

14. A battery charging circuit comprising:

a source of rectified AC current;

terminals for connecting a battery to be charged in the circuit;

switching means actuable for transmitting current from said source to the battery in response to electrical pulses; and a control circuit for controlling the actuation of said switching means to control the amount of current transmitted by said switching means, said control circuit comprising:

pulse generating means actuable for generating pulses for actuating said switching means;

phase control means for controlling the actuation of said pulse generating means to control the actuation of said switching means relative to the rectified AC current;

lamp means connected to the battery and generating an illumination corresponding to the battery voltage;

variable photo-resistance means having a resistance variable with the illumination of said lamp means to adjust said phase control means to regulate the generation of said pulses relative to said rectified AC current to effect variation in the charging rate on the battery inversely with the charge on the battery; and current limiting means comprising:

transistor means electrically connected to said lamp means, said transistor means causing the illumination of said lamp means to fall when the battery voltage is low relative to its fully charged value to cause said photo-resistance means to adjust said phase control means to limit the current in the circuit to values non-deleterious to the circuit; and non-linear resistance means for attenuating signals to said lamp means to avoid abrupt changes in the current in said circuit.

15. A battery charging circuit comprising:

a source of rectified AC current;

terminals for connecting a battery to be charged in the circuit;

switching means actuable for transmitting current from said source to the battery in response to electrical pulses; and a control circuit for controlling the actuation of said switching means to control the amount of current transmitted by said switching means, said control circuit including:

pulse generating means actuable for generating pulses for actuating said switching means;

phase control means for controlling actuation of said switching means relative to said rectified AC current in response to control signals;

first transistor means electrically connected to said phase control means for generating control signals to said control means; and second transistor means electrically associated with the battery and electrically connected to said first transistor means for driving said first transistor means according to the battery voltage, said second transistor means retarding the generation of control signals by said first transistor means when the battery is substantially discharged to protect the circuit from high instantaneous peak currents.

16. The invention according to claim 15 wherein said second transistor means is electrically connected with the battery to prevent the generation of control signals when the battery terminals are connected in reverse order to said terminals of the circuit.

17. A battery charging circuit for charging a battery from an AC source, said circuit comprising:
   terminals for connecting a battery to be charged in the circuit;
   silicon control rectifier means electrically associated with the AC source for transmitting pulsating DC current to the battery in response to trigger signals; and
   a control circuit for controlling the actuation of said silicon control rectifier means relative to the AC current to control the amount of current transmitted by said silicon control rectifier means, said control circuit comprising:
      rectifier means for energizing said control circuit with pulsating DC current in synchronization with the AC current to said silicon control rectifier means;
      means for adjusting the pulsating DC voltage in said control circuit to a constant value;
      unijunction transistor means for generating trigger signals to said silicon control rectifier means in response to firing signals;
      phase control means for generating firing signals to said unijunction transistor in response to control signals; and
      first transistor means electrically coupled to said phase control means for generating control signals to said phase control means, second transistor means electrically connected to said first transistor means for driving said first transistor means, float voltage means connected to said second transistor means for establishing a reference float voltage, said second transistor means causing said first transistor means to generate control signals when the battery voltage is below said reference float voltage to charge the battery to the float voltage, cell equalization reference value means electrically connected to said second transistor means for establishing a cell equalization reference voltage corresponding to the battery charge required to fully and equally charge the component battery cells, said second transistor means causing said first transistor means to generate control signals when the battery is below the cell equalization reference voltage to charge the battery to the cell equalization reference voltage, and leakage control means comprising a resistor-capacitor circuit connected across said second transistor means for causing said first transistor means to generate control signals to charge a substantially fully charged battery to compensate for battery leakage.

18. The invention according to claim 17 and further comprising:
   lamp means connected to the battery and generating an illumination corresponding to the battery voltage;
   variable photo-resistance means having a resistance variable with the illumination of said lamp means to adjust said phase control means to regulate the generation of said pulses relative to the pulsating DC current to effect variation in the charging rate on the battery inversely with the charge on the battery; and
   current limiting means comprising transistor means electrically connected to said lamp means, said transistor means causing the illumination of said lamp means to fall when the battery voltage is low relative to its fully charged value to cause said photo-resistance means to adjust said phase control means to limit the current in the circuit to values non-deleterious to the circuit.

19. The invention according to claim 18 wherein the rate of change of resistance of said variable photo-resistance means relative to the illumination incident thereon changes sharply at a critical illumination value corresponding to a predetermined low battery charge which could effect the transmission of deleteriously high currents in the circuit, said transistor means effecting an illumination of said lamp means below said critical value when the battery voltage attains said predetermined low charge to limit the current in the circuit to a value below the deleteriously high current value.

20. The invention according to claim 19 wherein said current limiting means further comprises non-linear resistance means for attenuating signals to said lamp means to avoid abrupt charges in the current in said circuit.

21. The invention according to claim 18 and further comprising:
   third transistor means electrically connected to said phase control means for generating control signals to said phase control means;
   fourth transistor means electrically connected to said third transistor means for driving said third transistor means and electrically associated with the battery for sampling the battery voltage, said fourth transistor means retarding the generation of control signals by said third transistor means to protect the circuit from high instantaneous peak currents.

22. The invention according to claim 21 wherein said fourth transistor means is electrically connected with said third transistor means and with the battery to prevent the generation of control signals when the battery terminals are connected in reverse order to said terminals of the circuit.

* * * * *